United States Patent

Lamb et al.

[11] Patent Number: 5,255,760
[45] Date of Patent: Oct. 26, 1993

[54] APPARATUS FOR DETECTING AND SIGNALING THE FUNCTION AND STATUS OF AN ELEVATOR SAFETY BRAKE

[75] Inventors: Miles P. Lamb, Bedminster, N.J.; Herbert Bachmann, Ebikon, Switzerland

[73] Assignee: Inventio AG, Hergiswil, Switzerland

[21] Appl. No.: 771,044

[22] Filed: Oct. 2, 1991

[51] Int. Cl.⁵ .................... F16D 66/00; B66B 5/16
[52] U.S. Cl. .................... 188/1.11; 188/72.9; 188/170; 187/73; 200/61.4; 192/30 W; 192/90; 340/454
[58] Field of Search .............. 188/1.11, 72.3, 72.9, 188/71.7, 110, 137, 171; 187/73, 108–109, 130, 133; 200/61.41; 192/30 W, 90; 340/453, 454

[56] References Cited

U.S. PATENT DOCUMENTS

| | | | |
|---|---|---|---|
| 1,304,870 | 5/1919 | Gale, Jr. | 187/108 |
| 3,604,865 | 9/1971 | Bricker | 188/1.11 X |
| 3,692,153 | 9/1972 | Eastcott et al. | 188/170 |
| 4,009,465 | 2/1977 | Rigalt | 340/454 |
| 4,232,768 | 11/1980 | Dufresne | 192/1.49 |
| 4,345,123 | 9/1982 | Eastcoti et al. | 200/61.44 X |
| 4,739,208 | 4/1988 | Kimberlin | 200/61.4 X |
| 4,805,741 | 2/1989 | de Jong et al. | 187/108 X |
| 4,826,255 | 5/1989 | Volz | 303/113 X |
| 4,982,815 | 1/1991 | Arabori et al. | 187/10.5 |
| 5,076,401 | 12/1991 | Ta et al. | 188/72.9 X |
| 5,103,940 | 4/1992 | Meneut et al. | 188/72.9 X |

FOREIGN PATENT DOCUMENTS 2617882 11/1976 Fed. Rep. of Germany.

Primary Examiner—Robert J. Oberleitner
Assistant Examiner—Josie A. Ballato
Attorney, Agent, or Firm—William J. Clemens

[57] ABSTRACT

An apparatus for detecting and signaling the function and the status of an electronically actuated two-circuit safety disk brake for elevators includes an axially moveable spring centering bolt and a sliding block attached to each of a pair of brake shoes for actuating position sensors. A force imbalance due to breakage of a brake pressure spring displaces the spring centering bolt from its neutral position and actuates a microswitch of a first position sensor by way of sliding block attached to the bolt to generate a signal to a monitoring circuit. A double switching arm formed on the sliding blocks attached to the brake shoes signals not only the normal closure and opening movements of the brake, but causes, on exceeding an admissible wear of the brake lining for the first time, an alarm switching cycle of a microswitch of a second position sensor.

18 Claims, 3 Drawing Sheets

APPARATUS FOR DETECTING AND SIGNALING THE FUNCTION AND STATUS OF AN ELEVATOR SAFETY BRAKE

BACKGROUND OF THE INVENTION

The present invention relates generally to elevators and, in particular, to an apparatus for detecting and signaling the function and status of a safety disk brake for elevators.

According to the current regulations for elevators, mechanical brakes in elevator drive units have to be constructed as so-called safety or emergency brakes. All of the mechanical parts of such brakes, which parts participate in the braking action onto the brake disk, must exist in duplicate and are designed in such a manner, that in case of failure of one of these parts, a braking action sufficient for the deceleration of the car loaded with a minimal load is maintained on the brake disk.

It is customary for the monitoring of the functions of a safety or emergency disk brake to actuate microswitches attached at appropriate points. The microswitches are actuated by the movements of the brake levers and/or magnetic plungers which, with the respective contact positions, form and influence part of a monitoring and safety circuit. Due to the generally short actuating distances, these microswitches are actuated exclusively by the magnetic plungers or by the end of the longer part of a brake lever. With such an arrangement however, only the simple movements of the two brake levers can be detected. In the case where a brake lever still moves but with reduced force due to the breakage of a spring, this failure is not recognized and a more or less reduced brake action results.

FIG. 1 of the German Patent Specification No. 26 17 882 shows a typical construction of a safety or emergency brake for elevators. It is obvious that appropriate microswitches are attached to the magnet housing and would be actuated by the upper end of the brake lever. The lower part of the magnet housing forms, as is customary, a rigid spring stop center, whereby the breakage of a brake pressure spring would most probably not be noticed immediately. Likewise, an overdue adjustment operation is not indicated.

SUMMARY OF THE INVENTION

The present invention is based on the problem of creating a device by means of which the function and condition or status of an electromagnetically actuated safety or emergency disk brake can be detected and signaled with simple means and construction. The advantages achieved by the invention can be seen essentially in that, besides the customary position detection, information is generated concerning an eventual force imbalance on the brake pressure springs and that the attainment of a maximally admissible wear of the brake lining is reported.

A further advantage of the present invention is that the detection of the force imbalance of the brake pressure springs is realized with the same means as for the customary position report.

The apparatus for detecting and signaling the function and the status of an electromagnetically actuated two-circuit safety disk brake for elevators comprises: a first position sensor attached to a support angle of a safety disk brake; a spring centering bolt mounted on the safety disk brake and moveable in response to a change of an initial stressing force of a brake pressure spring of the safety disk brake for actuating said first position sensor; and a pair of second position sensors attached to the support angle each actuated by an associated one of a pair of brake shoes of the safety disk brake for signaling a limit of wear of a brake shoe lining attached to the associated brake shoe. The first position sensor includes a microswitch attached to the support angle and a sliding block attached to the spring centering bolt and having at least one switching arm formed thereon for actuating the microswitch. Each of the second position sensors also includes a microswitch attached to the support angle and a sliding block attached to the associated brake shoe and having a pair of switching arms for actuating the microswitch, the microswitch including a roller lever cooperating with one of the pair of switching arms for actuating the microswitch. The roller lever is spaced from the one switching arm a predetermined distance when the safety disk brake is initially adjusted and closed, the predetermined distance corresponding to the maximally admissible wear of the brake shoe lining. The switching arms of the pair of switching arms are arranged at a maximum angle of 60° with respect to each other.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
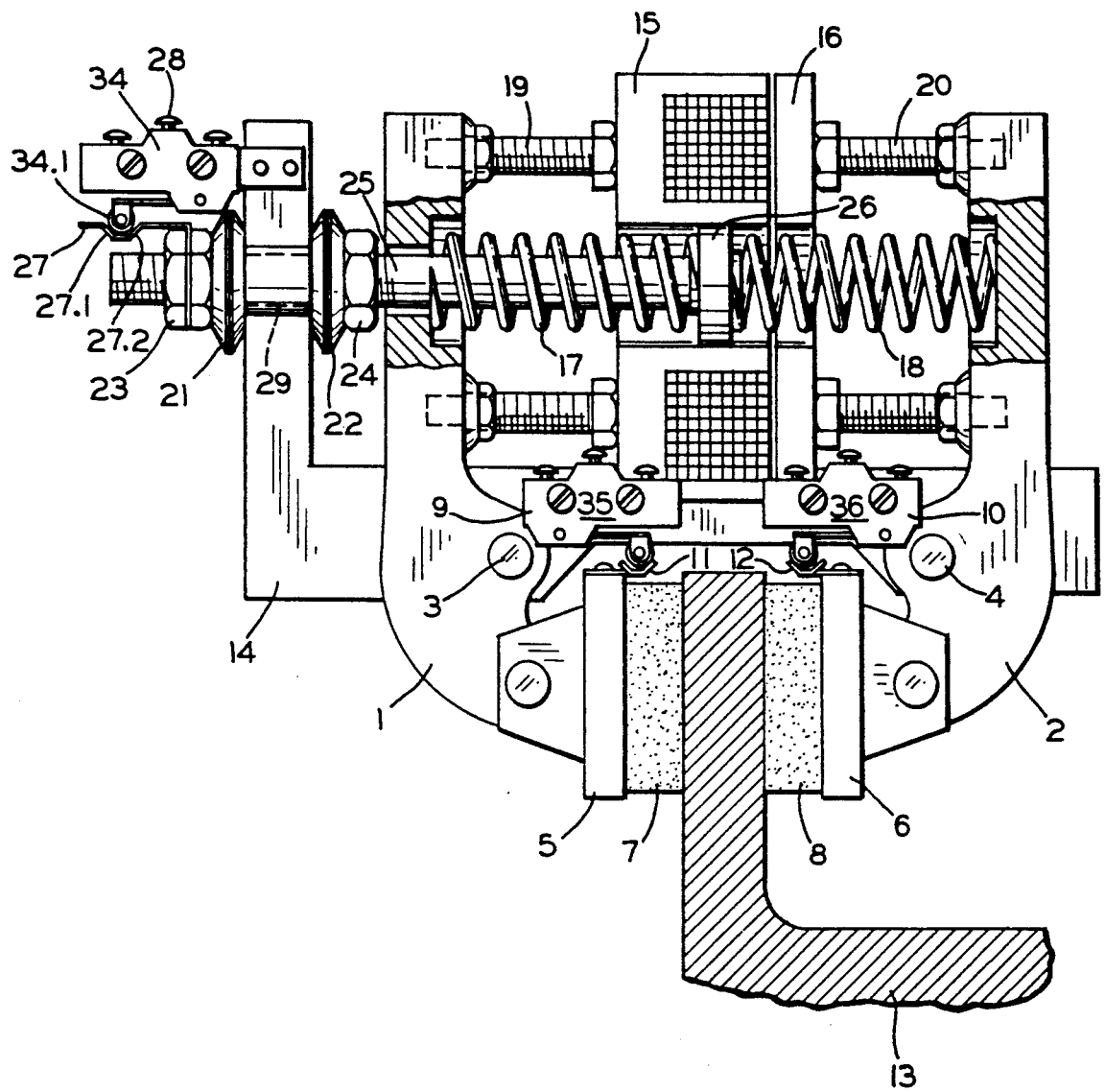
FIG. 1 is a top plan view of an elevator safety brake shoe including the detecting and signaling apparatus according to the present invention.

Shown in the FIG. 1 is an entire elevator safety disk brake including the detection and signaling apparatus according to the present invention. A support angle 14 is affixed to a not illustrated hoisting machine and has a pair of king pins 3 and 4 extending from a longer arm thereof. A pair of brake levers 1 and 2 are rotatably mounted on the pins 3 and 4 respectively and each lever has shorter leg and a longer leg extending from the respective pin. Attached to the shorter leg of each of the levers 1 and 2 are a pair of brake shoes 5 and 6, respectively, with opposed brake linings 7 and 8, respectively. The longer legs of the brake levers 1 and 2 are spread apart by means of two brake pressure springs 17 and 18 whereby the brake shoes 5 and 6 with their brake linings 7 and s are pressed against both sides of a brake disk 13 and exert a braking torque.

The brake pressure springs 17 and 18 are retained at outer ends in round indentations or recesses formed in the longer legs of the brake levers 1 and 2 and are retained at inner ends by a two-sided spring stop shoulder 26, which shoulder is located at the right end of a spring centering bolt 25. The spring centering bolt 25 is guided movably through a bore hole 29 formed in a shorter arm of the support angle 14 and fixed there. On the side of the bore hole 29 opposite the lever 1, a double nut 23 threadably engages the bolt 25 and retains a spring washer 21 against the support angle 14. On the side of the bore hole 29 adjacent to the lever 1, a nut 24 threadably engages the bolt 25 and retains a spring washer 22 against the support angle 14. Serving to release the brake is a braking magnet 15 attached with a screw bolt 19 to the brake lever 1 and an anchoring plate 16 attached with a screw bolt 20 to the brake lever 2 and attracted by the braking magnet 15.

A position sensor 28 is attached at a free end of the shorter arm of the support angle 14 and includes a microswitch 34 which is actuated by a roller lever 34.1 which contacts a sliding block 27 held in the double nut 23. The sliding block is formed with a pair of spaced apart switching arms 27.1 and 27.2 defining a depression into which the roller lever 34.1 fits maintaining the microswitch 34 in a non-actuated state. Upon horizontal movement of the spring centering bolt 25 in either direction along its longitudinal axis, the roller lever 34.1 is moved out of the depression in the sliding block 27 by an associated one of the switching arms 27.1 and 27.2 to actuate the microswitch 34. Designated by 9 and 10 are two additional position sensors including a pair of microswitches 35 and 36 respectively, which are actuated by a pair of sliding blocks 11 and 12 respectively. The blocks 11 and 12 are attached to the brake shoes 5 and 6 respectively.

Figure 2:
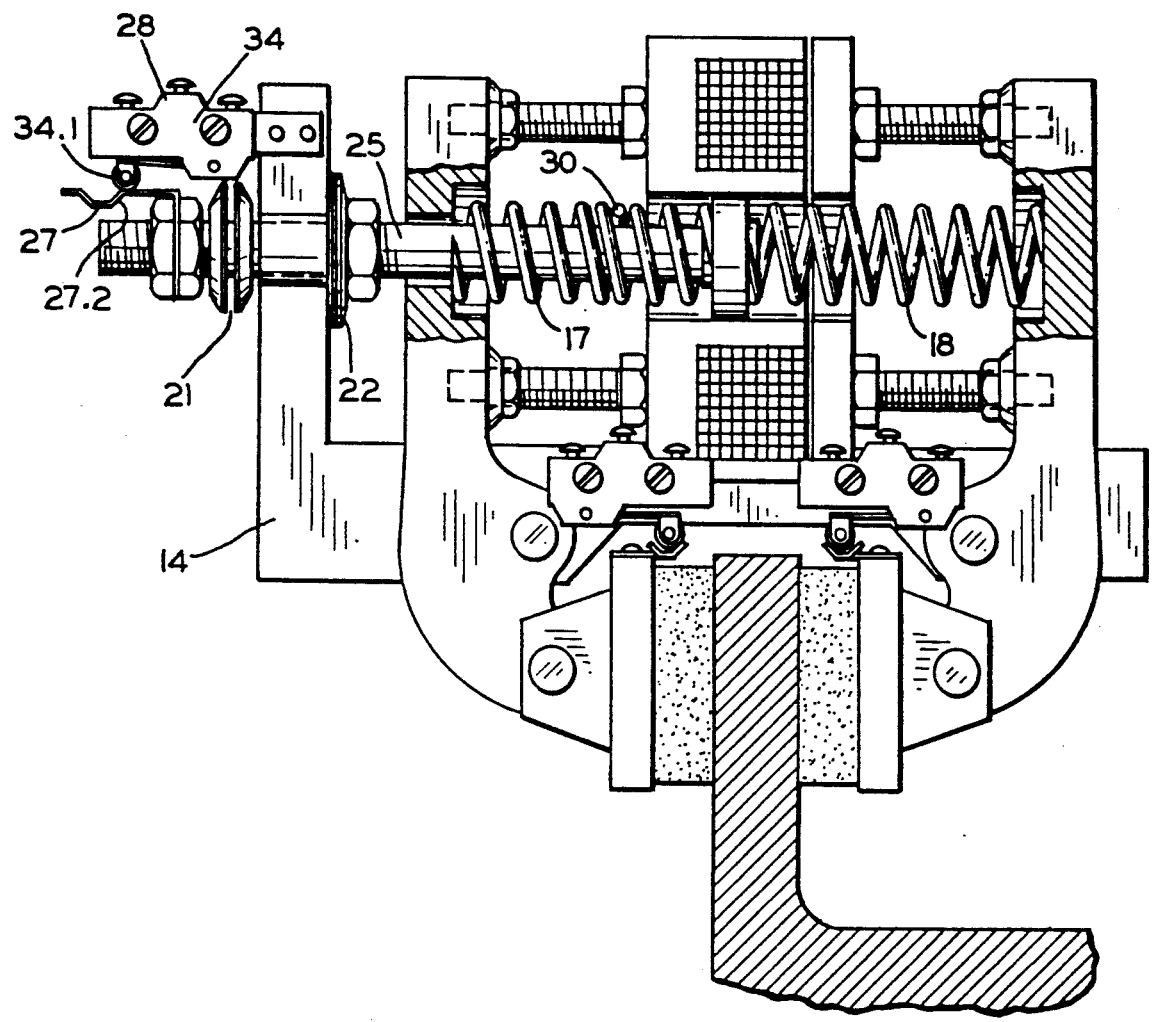
FIG. 2 is a view similar to the FIG. 1 showing the reaction of the apparatus in the case of breakage of a brake pressure spring.

A breakage of the brake pressure spring 17 is designated with 30 in the FIG. 2. The bolt 25 is forced to the left by the brake pressure spring 18 collapsing the spring washer 22 while freeing the spring washer 21. The roller lever 34.1 rides up the switching arm 27.2 to actuate the microswitch 34.

Figure 3:
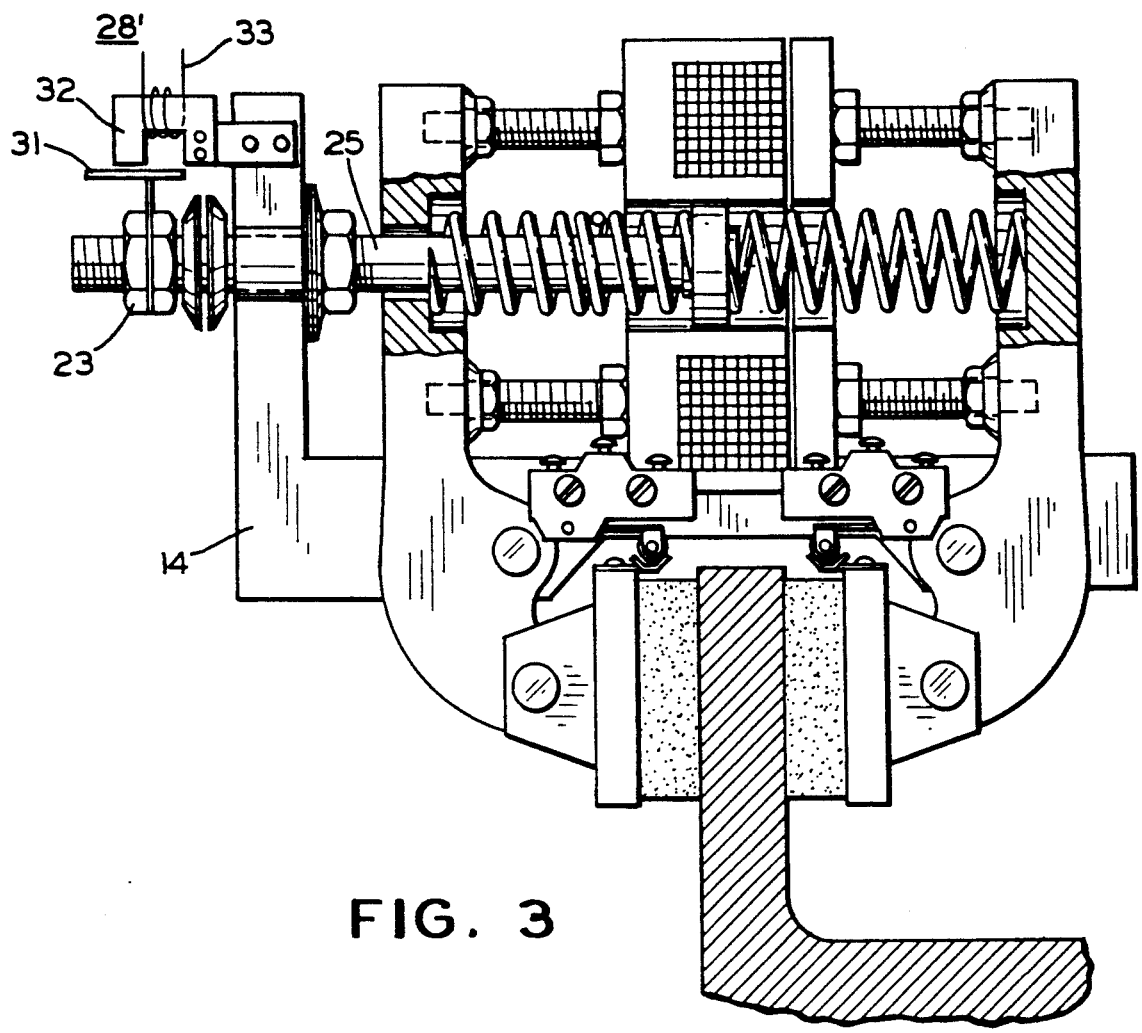
FIG. 3 is a view similar to the FIG. 2 showing an alternative position sensor.

In the FIG. 3, an alternative position sensor 28' is formed by an iron yoke 32 attached to the support angle 14, a coil 33 wound about the yoke and an armature lamination 31 held in the double nut 23. Movement of the bolt 25 in either direction moves the lamination 31 with respect to the yoke 32 thereby generating a signal in the coil 33.

Figures 4, 5:
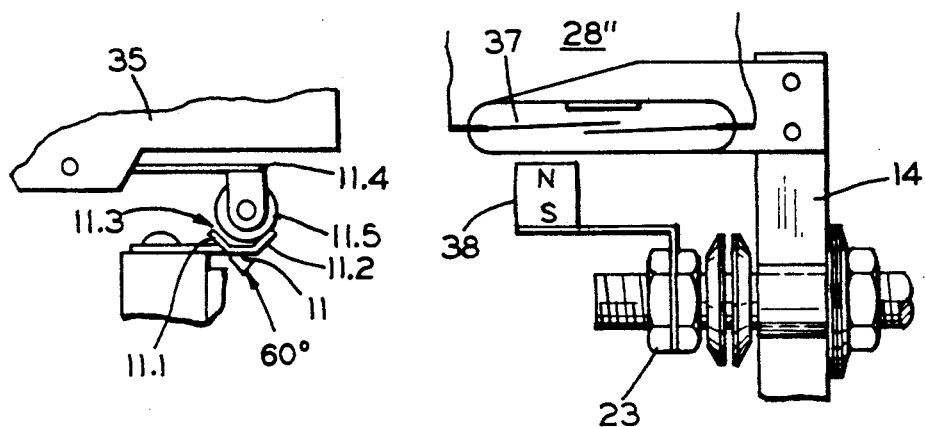
FIG. 4 is an enlarged fragmentary view of a microswitch shown in the FIG. 2.
FIG. 5 is an enlarged fragmentary view of another alternative position sensor.

Illustrated in the FIG. 4 are the details of the position sensor 9 where, in particular, the sliding block 11 must be noticed. The sliding block 11 has formed therein a pair of switching arms 11.1 and 11.2 which are at an angle of, for example, 60° with respect to each other to define a recess or notch. When the brake has been recently adjusted, a roller 11.5 of a roller lever 11.4 of the microswitch 35 is positioned in such a way within the switching arms 11.1 and 11.2 that a space 11.3 exists between the switching arm 11.1 and the roller 11.5.

The detecting and signaling apparatus described above operates in the following manner: the ready-for-work safety or emergency brake has the spring centering bolt 25 adjusted in such a manner that, in all operations of the safety brake, no actuation of the position sensor 28 takes place when the brake pressure springs are intact or in working order. This is the case because, initially, the nuts 23 and 24 are not tightened and the double-sided spring stop shoulder 26 and thus also the spring centering bolt 25 itself adjust themselves into a neutral force position and remain there quietly at uniform force equilibrium for all movements of the brake. In order to avoid an unnecessary actuation of the position sensor by small imbalances due to friction, the nuts 23 and 24 are tightened to such an extent that the springs 21 and 22 arranged between the nuts 23 and 24 on opposite sides of the bore hole 29 are only lightly prestressed. A further reason for the fixing of the neutral position is that on opening, the brake always has to assume the same position in order to avoid touching the brake linings 7 and 8 on the brake disk 13.

In the normal state of the brake, the detecting and signaling apparatus remains in the position shown in the FIG. 1 which means that the position sensor 28 is not actuated. Now, if the breakage 30 (FIG. 2) occurs in the brake pressure spring 17, due to fatigue or overload, a corresponding force imbalance is created based on the reduced force in the defective brake pressure spring 17. In that case, the spring centering bolt 25 is displaced to the left against the force of the spring washer 22 and the thereby likewise displaced switching arm 27.2 of the sliding block 27 presses the roller lever 34.1 upward and thus actuates the microswitch 34. With the microswitch 34 actuated and the spring washer 22 completely compressed, the displacement path of the spring centering bolt 25 is limited by the nut 24. The springs 22 and 23 are designed advantageously as cup springs, because their force pattern exhibits, at the appropriate pre-stress, the desired nonlinear characteristic for this application. Without this device, a defect such as the break 30 could not be noticed, because with the rigid spring stop center utilized, the brake will continue to function "normally", but with correspondingly reduced braking or retarding torque. Since such safety brakes customarily are combined with regulated drives, the brakes act under normal conditions only as parking or holding brakes. For this reason, such a defect can only be detected during an emergency braking operation because, in that case, the braking distance becomes longer with corresponding more or less dangerous consequences. The signal generated by the position sensor 28 actuated due to a defect can be transmitted to a safety circuit and/or to a central telemonitoring station.

As an alternative solution to a microswitch-displacement pickup, the application of an inductive position indicator is proposed according to the FIG. 3. In case of a brake spring failure, the armature lamination 31 held by the double nut 23 is displaced from a pole of the iron yoke 32 and the inductivity of the coil 33 is changed. The change in inductivity is, for example, evaluated digitally by way of bridge, amplifier and trigger circuits (not shown) and retransmitted in analog manner as mentioned previously.

According to the FIG. 5, an alternate embodiment position sensor 28" includes a reed contact switch 37 attached to the support angle 14 and a permanent magnet 38 attached to the spring centering bolt 25 for actuating the switch 37.

Further information relating to the state or condition of an elevator safety brake concerns the degree of wear of the brake linings. In the apparatus according to the present invention, the position sensors 9 and 10 are used to signal the brake position in addition to signaling the attainment of the admissible limit of wear of the brake linings through the appropriate design of the sliding blocks 11 and 12. Shown in the FIG. 4 is the detail of the sliding block 11 with the special design of the switching arms 11.1 and 11.2 which perform the dual function according to the invention. The roller 11.5 of the roller lever 11.4 is lying on the switching arm 11.2 such that upon movement of the sliding block 11 toward the left, occurring through opening operation of the brake, the roller 11.5 and the roller lever 11.4 are pressed immediately upward to actuate the microswitch 35, the internal spring contact of which indicates the orderly opening of the associated half of the brake. An analogous action also takes place at the other half of the brake with the position sensor 10.

With increasing wear of the brake lining 7, the sliding block 11 travels successively to the right but continues actuation of the microswitch 34 for indicating the position information of the brake movements. In the course of the wear of the brake linings, the space 11.3 is used up and the roller 11.5 begins to touch the switching arm 11.1 upon application of the brake. On further, progressing wear of the brake lining 7, the roller 11.5 begins to run up on the switching arm 11.1 upon application of the brake, and the position is reached wherein the microswitch 34 is switched twice during an application of the brake. The initially occurring switching cycle OFF-ON-OFF or ON-OFF-ON of the contact of the position sensors 9 and 10 upon application of the brake will now signal the attainment of the admissible limit of wear of the associated brake linings 7 and 8. The angle of the switching arms 11.1 and 11.2 with respect to each other is set, for example, as 60°, because in this way an increase of the vertical switching path by about 1.8 times is obtained in comparison to that of the operating brake shoes 5 and 6. The signaling of the admissible wear of the brake lining can, just as that of the spring defect or failure, be transmitted to a monitoring circuit and/or to a central tele-monitoring device. The principle of the apparatus according to the present invention can not only be applied to the type of construction of disk brakes shown, but likewise also to drum brakes. Also, the type of drive is unimportant for the application of the principle because a safety brake equipped with the described apparatus can also include an hydraulic, and electromotive or another arbitrary drive system. It is important in case of all variants of brakes that a slideable spring stop center is provided which, in case of a force imbalance, can trigger switching reactions in accordance with the above-described functions of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for detecting and signaling the function and the status of an electromagnetically actuated two-circuit safety disk brake for elevators comprising: a first position sensor mounted on a safety disk brake, a spring centering bolt mounted on the safety disk brake and moveable in response to a change of an initial stressing force of a brake pressure spring of the safety disk brake for actuating said first position sensor, said spring centering bolt being retained on the safety disk brake in a first position independent of said initial stressing force and being moved to a second position for actuating said first position sensor in response to a change in said initial stressing force, and at least a second position sensor mounted on the safety disk brake and actuated by a brake shoe of the safety disk brake for signaling a limit of wear of a brake shoe lining attached to the brake shoe.

2. The apparatus according to claim 1 wherein said first position sensor includes a microswitch attached to a support angle of the safety disk brake and a sliding block attached to said spring centering bolt and having at least one switching arm formed thereon for actuating said microswitch.

3. The apparatus according to claim 1 wherein said second position sensor includes a microswitch attached to a support angle of the safety disk brake and a sliding block attached to the brake shoe and having at least one switching arm for actuating said microswitch.

4. The apparatus according to claim 3 wherein said microswitch includes a roller lever cooperating with said one switching arm for actuating said microswitch and said roller lever is spaced from said one switching arm when the safety disk brake is initially adjusted and closed.

5. The apparatus according to claim 4 wherein when said safety disk brake is initially adjusted and closed, said switching arm is spaced from said roller lever a predetermined distance corresponding to an admissible limit of wear of the brake shoe lining.

6. The apparatus according to claim 5 wherein said sliding block has another switching arm and said one switching arm and said another switching arm are arranged at a maximum angle of 60° with respect to each other.

7. The apparatus according to claim 1 wherein said second position sensor includes a microswitch attached to a support angle of the safety disk brake and a sliding block attached to the brake shoe and having a pair of switching arms for actuating said microswitch, said microswitch including a roller lever cooperating with said switching arms for actuating said microswitch and said roller lever being spaced from one of said switching arms when the safety disk brake is initially adjusted.

8. The apparatus according to claim 1 wherein said second position sensor includes a microswitch attached to a support angle of the safety disk brake and a sliding block attached to the brake shoe and having at least one switching arm for actuating said microswitch, said microswitch including a roller lever cooperating with said switching arm for actuating said microswitch and said roller lever is spaced from said switching arm a predetermined distance when the safety disk brake is initially adjusted and closed, said predetermined distance corresponding to an admissible limit of wear of the brake shoe lining.

9. The apparatus according to claim 1 wherein said second position sensor includes a microswitch attached to a support angle of the safety disk brake and a sliding block attached to the brake shoe and having a pair of switching arms for actuating said microswitch, said switching arms being arranged at a maximum angle of 60° with respect to each other.

10. The apparatus according to claim 1 including a nut attached to said spring centering bolt and a spring positioned between said nut and a support angle of the safety disk brake, said nut being movable with respect to said bolt for prestressing said spring.

11. The apparatus according to claim 10 wherein said spring is a spring washer.

12. The apparatus according to claim 1 wherein said first position sensor is an inductive position indicator including an iron yoke attached to a support angle of said safety disk brake, a coil wound about said yoke and an armature lamination attached to said spring centering bolt adjacent to said yoke.

13. The apparatus according to claim 1 wherein said first position sensor includes a reed contact switch attached to a support angle of the safety disk brake and actuated by at least one permanent magnet attached to the spring centering bolt adjacent to said reed contact switch.

14. An apparatus for detecting and signaling the function and the status of an electromagnetically actuated two-circuit safety disk brake for elevators comprising:
   a first microswitch attached to a support angle of a safety disk brake;
   a spring centering bolt mounted on the safety brake and moveable in response to a change of an initial stressing force of a brake pressure spring of the safety disk brake;
   a sliding block attached to said spring centering bolt and having at least one switching arm formed thereon for actuating said microswitch; and
   at least a second microswitch attached to the support angle and actuated by a brake shoe of the safety disk brake for signaling a limit of wear of a brake shoe lining attached to the brake shoe.

15. The apparatus according to claim 14 including a sliding block attached to the brake shoe and having a pair of switching arms and wherein said second microswitch includes a roller lever cooperating with said pair of switching arms for actuating said second microswitch and said roller lever is spaced from one of said pair of switching arms a predetermined distance when the safety disk brake is initially adjusted and closed, said predetermined distance corresponding to an admissible limit of wear of the brake shoe lining.

16. The apparatus according to claim 15 wherein said switching arms of said pair of switching arms are arranged at a maximum angle of 60° with respect to each other.

17. An apparatus for detecting and signaling the function and the status of an electromagnetically actuated two-circuit safety disk brake for elevators comprising:
   a first position sensor attached to a support angle of a safety disk brake;
   a spring centering bolt mounted on the safety disk brake and moveable in response to a change of an initial stressing force of a brake pressure spring of the safety disk brake for actuating said first position sensor; and
   a pair of second position sensors attached to the support angle each actuated by an associated one of a pair of brake shoes of the safety disk brake for signaling a limit of wear of a brake shoe lining attached to the associated brake shoe.

18. The apparatus according to claim 17 wherein each of said second position sensors includes a microswitch attached to the support angle of the safety disk brake and a sliding block attached to the associated brake shoe and having at least one switching arm for actuating said microswitch, said microswitch including a roller lever cooperating with said switching arm for actuating said microswitch and said roller lever is spaced from said switching arm a predetermined distance when the safety disk brake is initially adjusted and closed, said predetermined distance corresponding to an admissible limit of wear of the brake shoe lining.

* * * * *